Nov. 24, 1953  B. O. AUSTIN  2,660,641
ELECTROMAGNETIC RELAY

Filed Aug. 12, 1950  2 Sheets-Sheet 1

INVENTOR
Bascum O. Austin.
BY 
ATTORNEY

INVENTOR
Bascum O. Austin.

Patented Nov. 24, 1953

2,660,641

UNITED STATES PATENT OFFICE 2,660,641

ELECTROMAGNETIC RELAY

Bascum O. Austin, Lima, Ohio, assignor to Westinghouse Electric Corporation, East Pittsburgh, Pa., a corporation of Pennsylvania Application August 12, 1950, Serial No. 179,054

7 Claims. (Cl. 200—106)

My invention relates, generally, to electromagnetic relays and, more particularly, to protective relays of a type suitable for utilization in electrical power systems for aircraft.

For maximum assurance of power continuity and safety an electrical power system for aircraft must have protection against faults. Such protection may be obtained by providing relays which are responsive to different fault conditions in the power system and which, in turn, control the operation of a generator field relay, thereby causing the generator which is faulted to be disconnected from the power system and its field excitation to be reduced.

Generator field relays of the latched type having a trip coil and a reset coil have been utilized. However, the prior relays have had either a complicated toggle mechanism to secure trip-free operation or an electrically trip-free arrangement external to the relay and comprising interlocking relays or switches.

An object of my invention, generally stated, is to provide an electromagnetic relay of the latched type which shall be simple and efficient in operation and which may be economically manufactured and installed.

A more specific object of my invention is to provide an electromagnetic relay of the latched type having a mechanical and electrical trip-free mechanism incorporated in the relay structure.

Another object of my invention is to provide an electromagnetic relay having a trip-free reset mechanism which may be remotely controlled.

A further object of my invention is to provide an electromagnetic relay of the latched type which is electrically tripped under predetermined conditions and which may be reset either manually or electrically.

Other objects of my invention will be explained fully hereinafter or will be apparent to those skilled in the art.

In accordance with my invention a relay of the latched type is provided with a trip coil which actuates an armature member to open contact members on the relay and a reset coil for actuating the reset mechanism which may also be operated manually to release the latching mechanism. Built into the relay is a simple trip-free reset mechanism which cannot be "teased" into a "dead" position, as is possible with toggle mechanisms.

For a better understanding of the nature and objects of my invention, reference may be had to the following detailed description, taken in conjunction with the accompanying drawings, in which.

Figure 1:
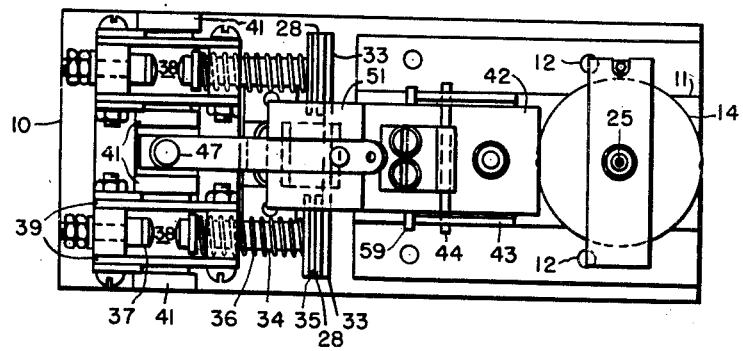
Figure 1 is a view, in plan, of a relay embodying the principal features of my invention.

Referring to the drawings, and particularly to Figs. 1 to 4, the electromagnetic relay shown therein comprises an insulating base member 10 to which a flanged U-shaped member 11 may be secured by screws 12 and which supports a trip coil 13 and a reset coil 14. The trip coil 13 is mounted in a U-shaped member 15 and surrounds a core 16. An armature 17 is pivotally supported by a reset bar 18 which, in turn, is pivotally mounted on a shaft 19 which extends through the sides of the U-shaped member 11.

Figure 4:
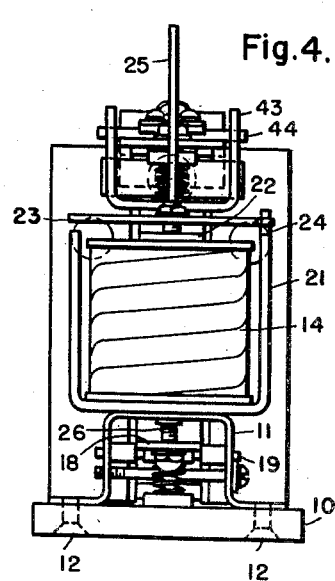
Fig. 4 is a view, in end elevation, of the relay.
Figure 4:
Figure 5:
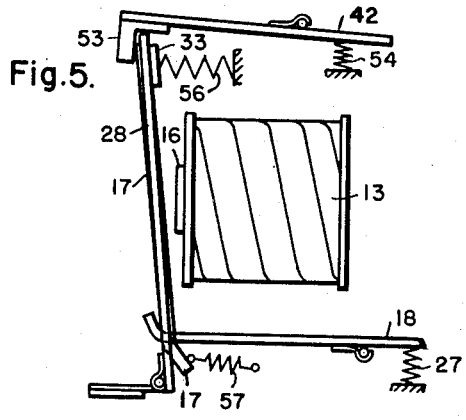
Figs. 5, 6, 7, 8 and 9 are diagrammatic views showing different steps in the operation of the relay.

As shown most clearly in Fig. 4, the reset coil 14 is mounted in a U-shaped member 21 and surrounds a core 22. One end of an armature 23 is disposed in an opening 24 on one leg of the U-shaped member 21. A rod 25 is attached to the armature 23, extends through a hole in the core 22, and projects through the bottom of the U-shaped member 21 and the top of the U-shaped member 11 to engage an adjustable screw 26 in the reset bar 18.

Figure 2:
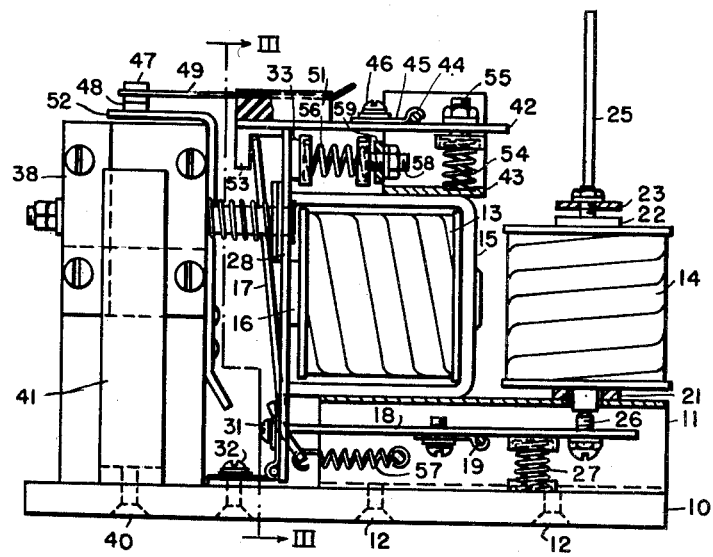
Fig. 2 is a view, partly in side elevation, and partly in section of the relay shown in Fig. 1.

The reset bar 18 is normally biased by a spring 27 to the position shown in Figure 2 in the drawing. When the reset coil 14 is energized, the armature 23 and the rod 25 are actuated downwardly to lower the end of the reset bar 18 containing the screw 26 and raise the end which supports the armature 17. The reset bar 18 may also be actuated manually by pushing downwardly on the rod 25.

Figure 3:
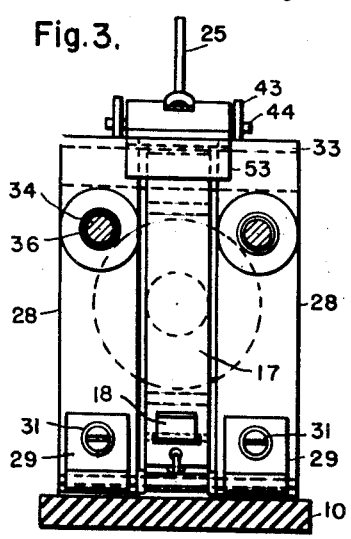
Fig. 3 is a view, in section, taken along the line III—III in Fig. 2.

As shown most clearly in Fig. 3, two spaced latch members 28 are hinged at their lower ends to the base 10 by hinge members 29 which are attached to the latch members by screws 31 and to the base 10 by screws 32. As shown, the latch members 28 are disposed on opposite sides of the armature 17 and are connected together at the top by a cross bar 33. As will be described more fully hereinafter, the upper end of the armature 17 engages the cross bar 33 to actuate the latch members 28 when the trip coil 13 is energized.

As shown most clearly in Fig. 1, each latch member 28 carries a contact member 34 which is slidably disposed in bushings 35 in the latch member 28 and is biased to the position shown in Fig. 1 by a spring 36 which surrounds the contact member 34. Each contact member 34 is disposed to engage a fixed contact member 37 when the latch members 28 are in their normal operating position. Each contact member 37 is mounted in an arc box 38 which may be of the usual construction and comprises side members 39 disposed between the legs of a U-shaped member 41 which is attached to the base 10 by screws 40.

A latch bar 42 is pivotally mounted in a U-shaped member 43 by means of a shaft 44 which extends through the legs of the member 43. The bar 42 may be attached to the shaft 44 by means of a clip 45 which is attached to the bar 42 by screws 46. The latch bar 42 carries an auxiliary contact member 47 which is disposed to engage a contact member 48 when the latch bar is in the position shown in Figure 2. The contact member 47 is attached to the bar 42 by a strap 49 having an insulating member 51 disposed between the strap and the top of the bar 42. The contact member 48 may be supported by a strap 52 which, in turn, is supported by the arc boxes 38.

As shown in Fig. 2, an L-shaped stop member 53 is attached to one end of the latch bar 42. When the latch bar 42, the armature 17 and the latch members 28 are in the position shown in Fig. 2, which is the tripped position of the relay, the upper ends of the latch members 28 are engaged by one leg of the L-shaped member 53 and the upper end of the armature 17 is engaged by the other leg of the L-shaped member 53. The latch bar 42 is biased to the position shown in Fig. 2 by a compression spring 54, the compression of which may be adjusted by a screw 55.

When the latch bar 42 is raised to disengage the latch members 28 from the L-shaped member 53, as will be described more fully hereinafter, a spring 56 actuates the latch members 28 to a position in which they are also engaged by the same leg of the L-shaped member 53 that engages the armature 17. Thus, the contact members 34 are actuated into engagement with the contact members 37 by the spring 56 and the contact pressure is determined by the springs 36 which are compressed when the contact members 34 engage the contact members 37. The contact members 34 and 37 are in engagement when the various parts of the relay are in their normal operating position.

As shown in Fig. 2 a tension spring 57 is connected to the lower end of the armature 17 to bias the armature to the position shown in Fig. 2. As also shown in Fig. 2, the compression of the spring 56 may be adjusted by a screw 58 which extends through a cross member 59 attached to the U-shaped member 43.

The operation of the relay may be understood by referring to Figs. 5 to 9 inclusive. The armature 17 and the latch members 28 are shown in their normal operating position in Figure 5. As shown, both the armature 17 and the latch members 28 are engaged by the downwardly extending leg of the L-shaped stop member 53 on the latch bar 42.

Figure 6:
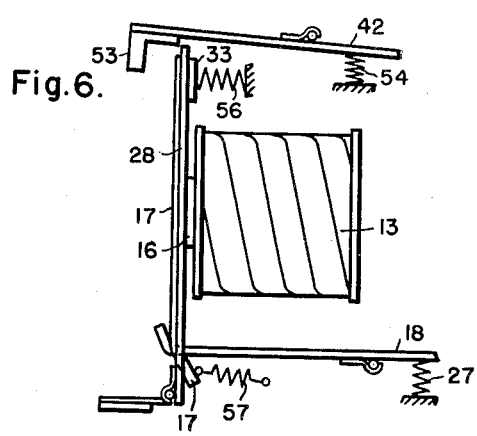
Figure 7:
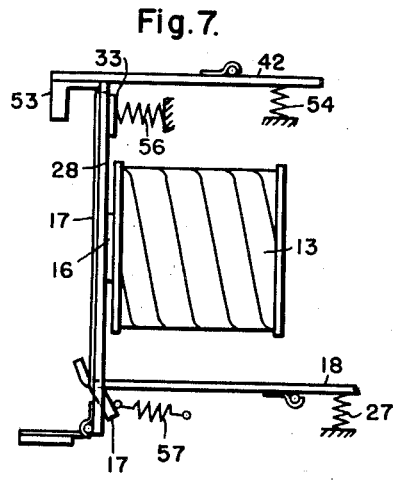

When the trip coil 13 is energized as the result of a fault in the power system the armature 17 is attracted towards the core 16, thereby actuating the latch members 28 to the position shown in Fig. 6 by engaging the cross member 33 and compressing the spring 56. As shown in Figure 7, the latch bar 42 is actuated by the spring 54 to cause the horizontal leg of the stop member 53 to engage the latch members 28 when the upper ends of the latch members have passed from under the stop member 53.

Figure 8:
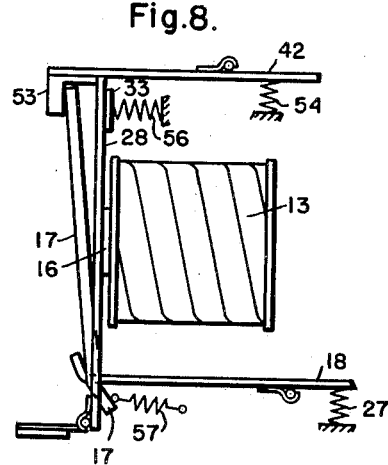

As shown in Fig. 8, the armature 17 is biased by the spring 57 into engagement with the downwardly extending leg of the stop member 53 when the trip coil is deenergized. It will be noted that the armature 17 is shorter than the latch members 28, thereby permitting the armature to be returned to the position shown in Fig. 8 while the latch members 28 are retained in the position shown in Fig. 8 by the upper ends of the latch members being engaged by the horizontal leg of the stop member 53.

Figure 9:
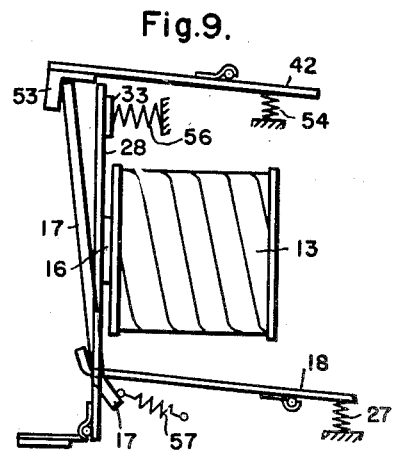

The relay may be reset, provided the trip coil remains deenergized, by energizing the reset coil 14 to cause the reset bar 18 to raise the armature 17 to the position shown in Fig. 9, thereby releasing the latch members 28 from engagement with the stop member 53. When the latch members 28 are released they return to the position shown in Fig. 5 which, as previously explained, is the normal operating position of the relay.

As previously explained, the relay may be reset manually by depressing the rod 25 to cause the reset bar 18 to raise the armature 17. However, the relay cannot be reset either electrically or manually if the trip coil 13 is energized during the resetting operation since the armature 17 will be immediately attracted toward the core 16 by the energization of the trip coil 13, thereby holding the latch members 28 in the position shown in Fig. 9 even though the armature 17 is raised by the operation of the reset bar 18. Thus, the relay is electrically and mechanically trip free without the addition of other relays or switches. Furthermore, the relay is so constructed that it cannot be "teased" into a "dead" position as is possible with toggle mechanisms previously utilized in trip free devices.

From the foregoing description it is apparent that I have provided a relay which is capable of performing the functions of a plurality of relays or switches heretofore provided in power systems. The relay is provided with a trip-free resetting mechanism which may be either electrically operated from a remote position or operated manually, as desired.

Since numerous changes may be made in the above described construction, and different embodiments of the invention may be made without departing from the spirit and scope thereof, it is intended that all matter contained in the foregoing description or shown in the accompanying drawings shall be interpreted as illustrative and not in a limiting sense.

I claim as my invention:

1. A relay device comprising a movable member carrying a contact adapted to engage a stationary contact, a coil, an armature member cooperating with said coil, said armature member being adapted to engage said movable member to move the movable member to separate the contacts when the coil is energized, a latch bar adapted to engage the movable member and hold it in position with the contacts separated, and means for moving the armature member to engage the latch bar to effect release of the movable member to allow the contacts to reclose.

2. A relay device comprising a movable member carrying a contact adapted to engage a stationary contact, a coil, an armature member cooperating with said coil, said armature member being adapted to engage said movable member to move the movable member to separate the contacts when the coil is energized, a latch bar adapted to engage the movable member and hold it in position with the contacts separated, a reset member, the armature being connected to the reset member, and means for actuating the reset member to move the armature member into engagement with the latch bar to effect release of the movable member to allow the contacts to reclose.

3. A relay device comprising a movable member carrying a contact adapted to engage a stationary contact, a coil, a movable armature member cooperating with said coil, a reset member, the armature member being pivotally mounted on the reset member and being adapted to engage said movable member to move the movable member to separate the contacts when the coil is energized, a latch bar adapted to engage the movable member to hold it in position with the contacts separated, and means for actuating the reset member to move the armature member into engagement with the latch bar to effect release of the movable member to allow the contacts to reclose.

4. A relay device comprising a movable member carrying a contact adapted to engage a stationary contact, means for biasing said movable member to hold the contacts in engagement, an armature member disposed adjacent the movable member and adapted to engage the movable member to move it away from the stationary contact, a coil adjacent the armature member adapted when energized to cause the armature member to move the movable member to separate the contacts, a pivotally mounted latch bar disposed in position to engage the movable member and hold it in position with the contacts separated, the armature member engaging another part of the latch bar when the coil is deenergized, a reset member engaging the armature member, and means for actuating the reset member to move the armature member to cause the latch bar to release the movable member to allow the contacts to reclose.

5. A relay device comprising a movable member carrying a contact adapted to engage a stationary contact, means for biasing said movable member to hold the contacts in engagement, an armature member disposed adjacent the movable member and adapted to engage the movable member to move it away from the stationary contact, a coil adjacent the armature member adapted when energized to cause the armature member to move the movable member to separate the contacts, a pivotally mounted latch bar disposed in position to engage the movable member and hold it in position with the contacts separated, the armature member engaging another part of the latch bar when the coil is deenergized, a reset member, the armature member being pivotally mounted on the reset member, and means for actuating the reset member to move the armature member to cause the latch bar to release the movable member to allow the contacts to reclose.

6. A relay device comprising a movable member carrying a contact adapted to engage a stationary contact, means for biasing said movable member to hold the contacts in engagement, an armature member disposed adjacent the movable member and adapted to engage the movable member to move it away from the stationary contact, a coil adjacent the armature member adapted when energized to cause the armature member to move the movable member to separate the contacts, a pivotally mounted latch bar disposed in position to engage the movable member and hold it in position with the contacts separated, the armature member engaging another part of the latch bar when the coil is deenergized, a pivotally mounted reset member, the armature member being pivotally mounted on the reset member adjacent one end thereof, and means for moving the reset member about its pivot to cause the armature member to move the latch bar to release the movable member to allow the contacts to reclose.

7. A relay device comprising a movable member carrying a contact adapted to engage a stationary contact, means for biasing said movable member to hold the contacts in engagement, an armature member disposed adjacent the movable member and adapted to engage the movable member to move it away from the stationary contact, a first coil adjacent the armature member adapted when energized to cause the armature member to move the movable member to separate the contacts, a pivotally mounted latch bar disposed in position to engage the movable member and hold it in position with the contacts separated, the armature member engaging another part of the latch bar when the coil is deenergized, a pivotally mounted reset member, the armature member being pivotally mounted on the reset member adjacent one end thereof, a second coil, and means for moving the reset member about its pivot when the second coil is energized to cause the armature member to move the latch bar to release the movable member to allow the contacts to reclose.

BASCUM O. AUSTIN.

References Cited in the file of this patent

UNITED STATES PATENTS

| Number | Name | Date |
|---|---|---|
| 776,090 | Runge | Nov. 29, 1904 |
| 1,186,561 | Evans | June 13, 1916 |
| 1,190,060 | Wolff | July 4, 1916 |
| 1,498,424 | Christopher | June 17, 1924 |
| 1,682,466 | Austin | Aug. 28, 1928 |
| 1,695,907 | Wensley | Dec. 18, 1928 |
| 1,798,667 | Grissinger | Mar. 31, 1931 |
| 1,902,490 | Crago | Mar. 21, 1933 |
| 2,098,353 | Nicolaus et al. | Nov. 9, 1937 |